(12) United States Patent
Dotzer et al.

(10) Patent No.: US 6,222,968 B1
(45) Date of Patent: Apr. 24, 2001

(54) CABLE FITTING FOR A LIGHT WAVEGUIDE CABLE, WHICH IS SECURED TO A CABLE OF A HIGH-VOLTAGE OVERHEAD LINE

(75) Inventors: Peter Dotzer, Berg; Ernst Mayr, Starnberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/358,749

(22) Filed: Jul. 21, 1999

(30) Foreign Application Priority Data

Jul. 21, 1998 (DE) .............................. 198 32 821

(51) Int. Cl.⁷ ..................................... G02B 6/44
(52) U.S. Cl. ...................... 385/100; 385/134; 385/135; 174/70 A
(58) Field of Search .................. 385/100, 101, 385/134, 135, 136; 174/70 A

(56) References Cited

U.S. PATENT DOCUMENTS

| 4,424,412 | * | 1/1984 | Goetter | 174/92 |
| 4,805,979 | * | 2/1989 | Bossard | 185/135 |
| 5,479,554 | | 12/1995 | Roberts . | |
| 5,631,993 | * | 5/1997 | Cloud | 385/135 |
| 5,644,671 | * | 7/1997 | Goetter | 385/135 |
| 5,727,106 | * | 3/1998 | Sutehall | 385/100 |
| 5,970,199 | * | 10/1999 | Minchey | 385/134 |

FOREIGN PATENT DOCUMENTS 32 46 997  12/1982 (DE) .
43 41 999  12/1993 (DE) .
196 48 755  11/1996 (DE) .

\* cited by examiner

*Primary Examiner*—Cassandra Spyrou
*Assistant Examiner*—Leo Boutsikaris
(74) *Attorney, Agent, or Firm*—Schiff Hardin & Waite

(57) ABSTRACT

The invention provides a cable fitting which receives light waveguide cables, which are supported by high-voltage overhead lines, or their light waveguide splices and excess lengths. The light waveguide cables are secured to a ground cable or a phase cable of a high-voltage overhead line by a bracket and are decoupled from the high-voltage via an insulator on a down-lead to the cable fitting.

18 Claims, 3 Drawing Sheets

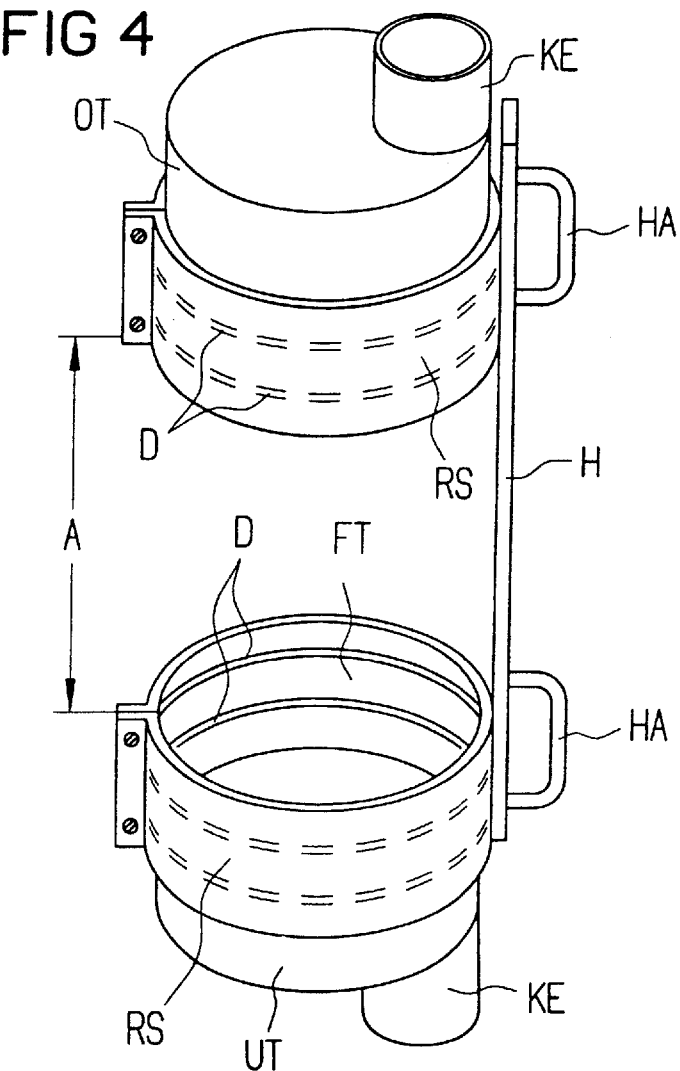
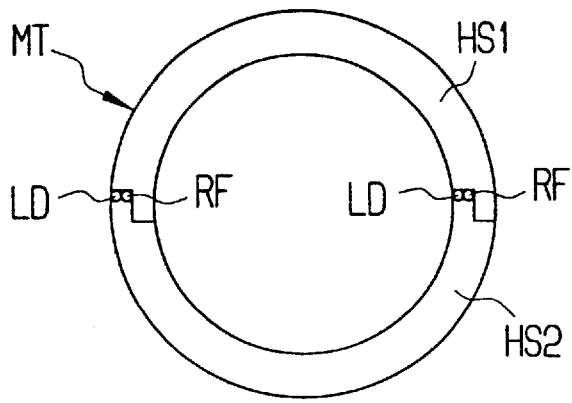

CABLE FITTING FOR A LIGHT WAVEGUIDE CABLE, WHICH IS SECURED TO A CABLE OF A HIGH-VOLTAGE OVERHEAD LINE

BACKGROUND OF THE INVENTION

The present invention relates to a cable fitting for a light waveguide cable, which is secured to a cable of a high-voltage overhead line and is guided through an insulator in a region of the light waveguide cable down-lead.

A great variety of cable fittings for the acceptance of light waveguide splices and light waveguide excess lengths are known; however, they are mostly not appropriate for secure protection in the case of a down-lead in a high-voltage system. Thus, light waveguide cables, which are referred to a AD (or ALL Dielectric) bracket cables, have recently been bracketed onto cables of high-voltage overhead lines by appropriate means, such as by straps. However, given the down-lead of such a light waveguide cable, difficulties arise regarding the high-voltage values. When the light waveguide cable is bracketed onto a phase cable of the high-voltage overhead lines, it must be particularly assured that a person can safely touch the down-leaded light waveguide cable, as well as the utilized cable fitting. Thus, for example, it is already known from German patent application No. DE 196 48 755 that an insulator, through which the light waveguide cable, or its light waveguide, is guided, can be used on the down-lead of a light waveguide cable that is bracketed onto a phase cable of a high-voltage overhead line. The light waveguide cable covering is thereby stripped and only the light waveguides are guided further, as warranted, together with an envelope that surrounds them. When using traditional cable fittings, these would have to be immediately mounted at a great height on a pole in order to guarantee protection against physical contact and protection against vandalism.

However, this means that large excess lengths of light waveguide cable would have to be arranged in the region of the mounted cable fitting. The excess length must be sufficient in order to carry out splice and service work on the ground. As schematically illustrated in FIG. 1, the excess length of this light waveguide cable is arranged in loops which is referred to as an air cable cross, at the cable fitting.

SUMMARY OF THE INVENTION

It is an object of the present invention to create a cable fitting in its embodiment and in its assembly position in the down-lead region of a light waveguide cable used with high voltage overhead lines, wherein assembly work and reachability are improved and wherein protection and safety are increased. This object is inventively achieved in accordance with the invention in a cable fitting comprising a top part and a bottom part having cable admissions and arranged at a distance from each other on a holding device that is to be fastened to the pole of the high-voltage overhead line; a middle part made of half shells with longitudinal seals arranged between the top part and the bottom part; one pipe clamp arranged for sealing between a first end of the middle part and the top part and between a second end of the middle part and the bottom part; seal rings arranged on the inwardly facing side of the pipe clamps; and sealant injectable into the cable admissions.

The invention cable fitting is structured as a connection or branch fitting for a light waveguide cable, wherein the light waveguide cable is bracketed onto a conductor cable of a high-voltage overhead line with the help of a strap. The inventive embodiment which is constructed particularly assembly-friendly for this purpose, can be mounted to a pole at an accessible height and, nonetheless, be protected against vandalism. In a fully dielectric embodiment, too, the inventive cable fitting is appropriate for receiving light waveguide cables that are bracketed onto a phase cable of the high-voltage overhead line. Wood or concrete poles are mainly used in the medium voltage region for the high-voltage overhead line, and the cable fitting is fastened at a height of approximately 2–3 m. In order to sufficiently protect the thin light waveguide cables from vandalism, they are guided in pipes that are destruction-resistant. The housing of the cable fitting and, as warranted, the feeder pipes for the cables are made of fiber glass-reinforced plastic, preferably polyester, or metal, preferably aluminum injection molding. Advantageously, the housing is manufactured in the extrusion process. The cable fitting essentially comprises a cylindrical top part, a cylindrical bottom part and a middle part that is to be inserted in between the top part and the bottom part. The middle part is fashioned from two half shells. The top part and the bottom part are provided with cable admissions at the terminating sides that are asymmetrically arranged, so that they are situated close to the pole after assembly. Thereby, the introduction of the light waveguide cables into the cable admissions of the cable fitting can ensue without significant bending. The middle part of the cable fitting comprises two halves, which are put together after finishing the splice work by using an appropriate, non-hardening sealant, and are inserted between the top part and the middle part. A cylindrical guide part is respectively inserted in the top part and the bottom part. The half shells are aligned at the cylindrical guide part. Advantageously, tear threads, preferably from aramide, together with swelling powder are put into seal regions of the half shells, so that a later opening can be performed assembly-friendly.

Initially, the top part and the bottom part are fastened at the pole during the assembly, whereby a corresponding holding device is provided that can be, in particular, easily fastened to the pole with a tightening strap. Additionally, it is thereby advantageous that the spacing for the middle part is given, given utilization of such a holding device. When sealing, the cable admissions are provided with a corresponding casting compound, such as a flexible polyurethane resin mix for example, and are thereby sealed. In a further embodiment, the sealing can also be performed by injecting sealant into corresponding seal channels of the cable fitting, particularly into the longitudinal seals in the middle region.

In principle, a variety of splice aids, splice holding devices and excess length arrangements can be utilized in the interior of the inventive cable fitting, however, a multi-functional module (MFM) is particularly appropriate therefor. The multi-functional module comprises corresponding holders for light waveguide excess lengths and for light waveguide splices.

Usually, the splice work is carried out on the ground. In accordance with the invention, a specific advantage result from the low assembly height, so that only relatively small excess lengths need to be accommodated. Thereby, the previous known accumulation of excess lengths at what is referred to as the air cable cross at a high height at the pole is no longer necessary. The assembly of the entire system can also be carried out in a simple manner, whereby the following assembly sequence results. Initially, the protection pipes are fastened to the pole and the light waveguide cable that is to be down-leaded is inserted into the protection pipes. The top part and the bottom part are then mounted onto the pole, preferably with the corresponding holding device. Given assembly with the corresponding holding device, the necessary spacing for the middle part is automatically given. Alternatively, the top part and the bottom part must be mounted at the necessary spacing given assembly without a holding device. The light waveguide cable is then stripped, the corresponding light waveguides are spliced, the splices are deposited in the splice holder, and the light waveguide excess lengths are inserted. In a further assembly step, the sealant is applied in the seal regions of the middle part and the half shells are put together. The locking and the sealing of the middle part relative to the top part or the bottom part ensue by closing the pipe clamps, whereby the circumferential seals are pressed in. Finally, the inputs and outputs are filled up with sealant. If required, the pipe clamps can be provided with a lock, so that the cable fitting is protected against unauthorized opening. Generally, a cable fitting in accordance with the invention has a length of approximately 400 mm and a diameter of approximately 100 mm.

These and other features of the invention are discussed in greater detail below in the following detailed description of the presently preferred embodiments with reference to the accompanying drawings.

BRIEF DESCRIPTION OF THE DRAWINGS

FIG. 4 is perspective view of the top part and the bottom part of the cable fitting at a holding device.

FIG. 5 is a cross section through the middle part comprised of half shells.

DETAILED DESCRIPTION OF THE PRESENTLY PREFERRED EMBODIMENTS

Figure 1:
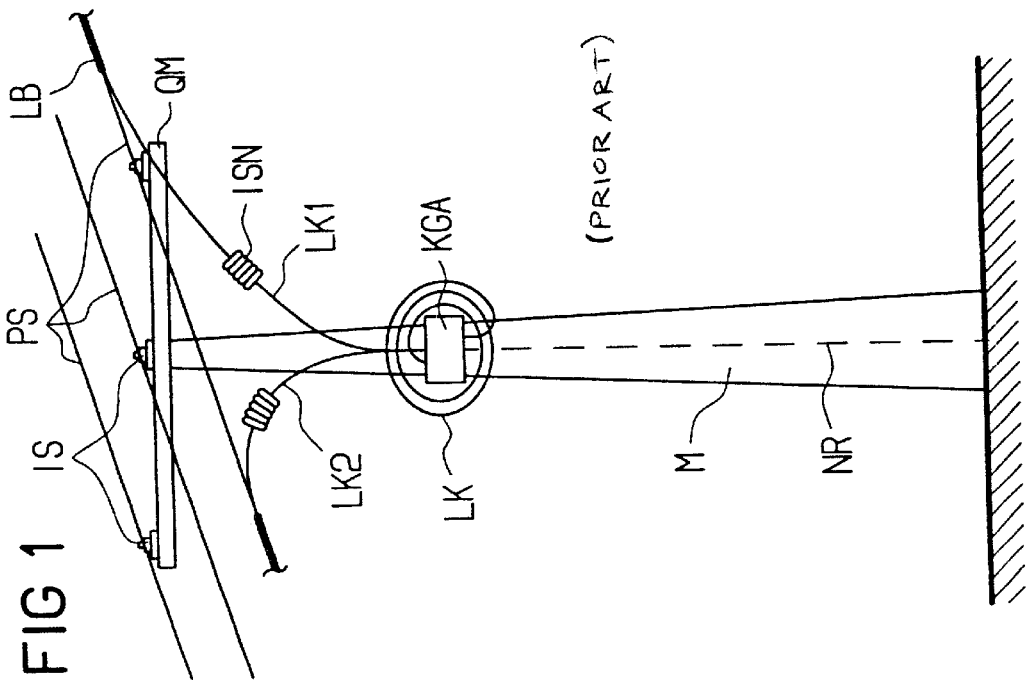
FIG. 1 is a perspective illustration showing a down-lead according to the prior art.

FIG. 1 illustrates a prior art cable fitting, given a down-lead of a light waveguide cable arrangement. It can be seen that a light waveguide cable LK1, which is bracketed onto a phase cable PS of a high-voltage overhead line with a strap LB, is down-lead into a cable fitting KGA, which is fastened to a pole M. The light waveguide cable LK1 is guided through an insulator ISN at the down-lead, wherein a cable covering (not shown) of the light waveguide cable LK1 is interrupted and only light waveguides (not shown) that are located in the filled lead envelop are guided through. Decoupling from the high-voltage ensues in this way. Splicing and/or further guiding of the light waveguide cable LK1 is undertaken in the cable fitting KGA. Upon slicing, the light waveguide cable LK1 is in turn continued as light waveguide cable LK2 for example, which is in turn bracketed onto the phase cable PS of the next high-voltage field. It can be seen from this arrangement that the cable fitting KGA is fastened at a great height on the pole M in order to protect it from unauthorized access or vandalism. However, since splice work or other service work is carried out on the ground, a correspondingly large excess length of light waveguide cable LK must be provided. This excess length LK has been arranged in what is referred to as an air cable cross in the height of the installed cable fitting KGA. Further, it is indicated that the light waveguide cable can also be guided within a down-lead pipe NR to the ground.

Figure 2:
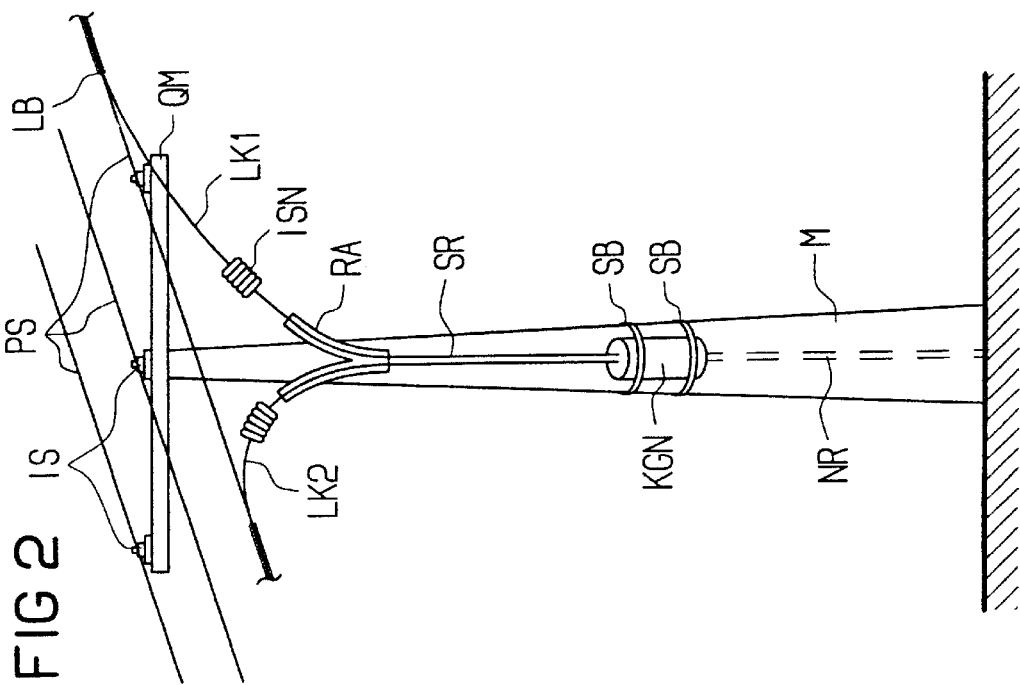
FIG. 2 is a perspective illustration showing a down-lead with an inventive cable fitting constructed according to the invention.
Figure 3:
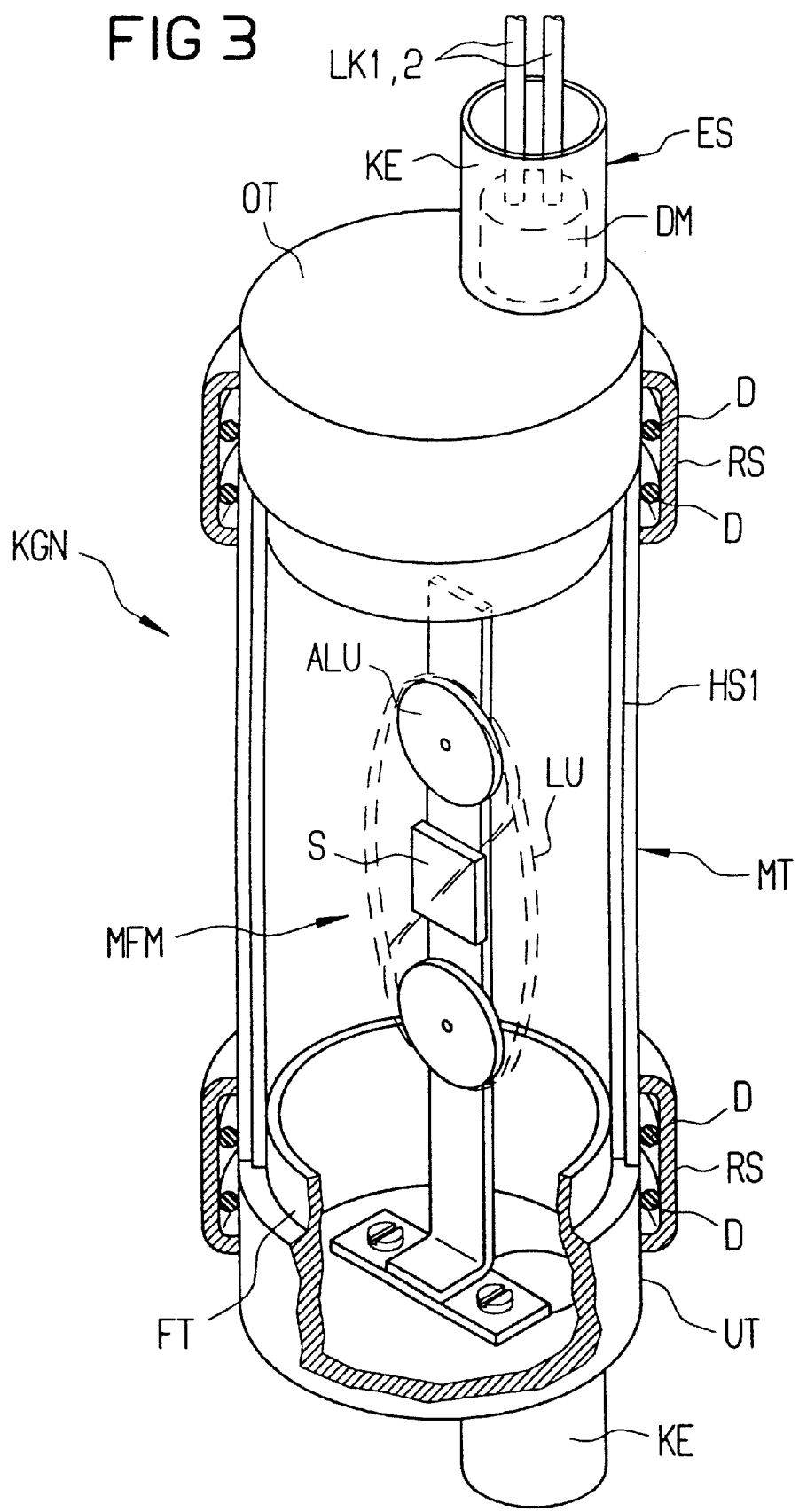
FIG. 3 is a perspective view in partial section of the cable fitting in a partly opened state.

In contrast, FIG. 2 illustrates an inventive cable fitting KGN that can be mounted onto the pole M at a low height of approximately 2 to 3 m, since not only the down-lead LK1, but also the cable fitting KGN are utilized in a correspondingly protected embodiment. Therewith, the excess length of the light waveguide cable LK (FIG. 1) is also no longer necessary, since the much shorter excess length can be deposited as loose light waveguide cables within the cable fitting KGN in an appropriate multifunctional module (FIG. 3). The down-lead of the light waveguide cable LK1, as well as the re-supply of the light waveguide cable LK2 are provided at least in an impact-resistant protection pipe SR. A down-lead to the ground can be provided in an impact-resistant down-lead pipe NR. The protection pipe SR, as well as the down-lead pipe NR are directly introduced into the cable admissions KE (FIG. 3) of the cable fitting KGN, where sealing is undertaken. The discharged and the supplied light waveguide cables LK1 and LK2 are also guided through insulators ISN. The branching of the light waveguide cables LK1 and LK2 is undertaken with a Y-shaped pipe exit RA. Bracketing of the light waveguide cables LK1 and LK2 ensues in turn with the known bracketing method LB via a phase cable PS that is fastened via insulators IS at a cross pole QM. The cable fitting KGN is fastened to the pole M with tightening straps SB.

The details of the invention cable fitting KGN are explained with reference to FIG. 3. This cable fitting KGN comprises a top part OT, a bottom part UT and a middle part MT that is inserted between the top part OT and the bottom part UT. The middle part MT is preferably fashioned from two half shells HS1 and HS2, whereby the second half shell HS2 cannot be seen here. Initially, the top part OT and the bottom part UT are kept at a distance that corresponds to the height of the middle part MT. After the service work, during which the light waveguide cables LK1 and LK2 are introduced, has been carried out, the half shells HS1 and HS2, which are situated at guide points FT in the top part OT and in the bottom part UT, are inserted. After the introduction of the longitudinal seal LD (FIG. 5) into the longitudinal seal regions (not shown) between the half shells HS1 and HS2, the pipe clamps RS are closed between the top part OT at the top end of the middle part MT and between the bottom part UT and the bottom end of the middle part MT, whereby the sealing ensures by two circumferential seals D that are inserted in the interior of pipe clamps RS. The cable admissions KE are filled up with sealant DM, preferably by injecting through an injection opening ES Before closing the light waveguide splices are deposited and fixed on a splice holder S and the light waveguide excess lengths LU are deposited and fixed in an excess length receptacle ALU.

FIG. 4 illustrates an inventive embodiment wherein the top part OT and the bottom part UT are already fixed at the necessary distance A to a holding device H for the middle part MT (FIG. 3) that is to be inserted. The holding device H, for example, has two shoulders HA for the acceptance of tightening straps SB (FIG. 1) given fastening to the pole M (FIG. 1). Further, the pipe clamps RS are already co-fastened, so that assembly is greatly facilitated. The paired circumferential seals D can be inserted within the pipe clamps RS, whereby one seal D lies on the middle part MT (FIG. 3) and the second seal D lies on the top part OT or the bottom part UT. The guide part FT, at which the half shells of the middle part MT (FIG. 3) are supported, can also be seen in the bottom part UT. It can also be seen that the cable admissions KE are arranged eccentrically in the face sides of the top part OT or the bottom part UT, so that the openings are close to the pole M (FIG. 1) and the light waveguide cables LK1 and LK2 (FIG. 3) can be introduced without great bending given the introduction of the light waveguide cables LK1 and LK2 (FIG. 3).

FIG. 5 illustrates, in cross-section, an example of extruded half shells HS1 and HS2 of the middle part MT. The longitudinal edges, for example, are fashioned as stripped edges in order to prevent mutual slipping. Further, the longitudinal edges, for example, are provided with applied portions for the longitudinal seals LD, whereby, for example, tear threads RF made of aramide are also introduced. The tear threads RF serve as an aid when opening the cable fitting i.e., when separating the half shells HS1 and HS2.

Although modifications and changes may be suggested by those skilled in the art, it is the intention of the inventors to embody within the patent warranted hereon all changes and modifications as reasonably and properly come within the scope of their contribution to the art.

We claim as our invention:

1. A cable fitting for a light waveguide cable, which is secured to a cable of a high-voltage overhead line and is down-lead through an insulator, said cable fitting comprising:

a top part having a first cable admission;

a bottom part arranged at a distance from said top part and having a second cable admission;

a holding device attachable to said top and bottom parts and fastenable to a pole of said high-voltage overhead line;

a middle part formed from a first half shell and a second half shell and have a first end and a second end, said first and second half shells joining at longitudinal seals, said middle part being arranged between said top part at said first end and said bottom part at said second end;

a top pipe clamp circumferentially securable about an interface between said first end of said middle part and said top part;

a bottom pipe clamp circumferentially securable about an interface between said second end of said middle part and said bottom part;

a number of seal rings arranged on an inwardly facing side of said top and bottom pipe clamps, wherein a seal region is formed between said seal rings; and sealant injectable into said first and second cable admissions.

2. The cable fitting as claimed in claim 1, wherein said sealant is flexible polyurethane mix.

3. The cable fitting as claimed in claim 1, wherein said holding device comprises at least one shoulder, wherein said holding device is fastened to said pole via at least one tightening strap received in said shoulder.

4. The cable fitting as claimed in claim 1, wherein said first cable admission connects to a protection pipe.

5. The cable fitting as claimed in claim 1, wherein said seal rings are silicone.

6. The cable fitting as claimed in claim 1, further comprising a multi-functional module having at least one light waveguide splice holder and having a light waveguide excess length receptacle.

7. The cable fitting as claimed in claim 1, wherein said top part and said bottom part are fixedly attached to said holding device at a spacing that is determined by a length of said middle part.

8. The cable fitting as claimed in claim 7, wherein said top and bottom pipe clamps are attached to said holding device.

9. The cable fitting as claimed in claim 1, further comprising a number of tear threads arranged with said longitudinal seals between said first and second half shells of said middle part.

10. The cable fitting as claimed in claim 1, wherein said seal regions are injected with injectable plastic.

11. The cable fitting as claimed in claim 1, wherein said top and bottom pipe clamps further comprise a lock.

12. The cable fitting as claimed in claim 1, wherein said top part, said bottom part and said middle part are made of impact resistant plastic.

13. The cable fitting as claimed in claim 1, wherein said top part, said bottom part and said middle part are made of metal.

14. The cable fitting as claimed in claim 1, wherein said light waveguide cable is secured to a phase cable of said high-voltage overhead line by a bracket.

15. The cable fitting as claimed in claim 1, wherein said light waveguide cable is secured to ground cable of said high-voltage overhead line by a bracket.

16. The cable fitting as claimed in claim 1, wherein a cable covering of said down-lead light waveguide cable is stripped when down-lead through said insulator.

17. The cable fitting as claimed in claim 1, wherein a light waveguide cable exiting from said second cable admission is out-lead in a down-lead pipe.

18. The cable fitting as claimed in claim 9, wherein said tear threads are aramide and said longitudinal seals are silicone.

* * * * *